(12) United States Patent
Yan et al.

(10) Patent No.: US 9,291,079 B2
(45) Date of Patent: Mar. 22, 2016

(54) ENGINE AFTERTREATMENT SYSTEM WITH EXHAUST LAMBDA CONTROL

(76) Inventors: Mi Yan, Columbus, IN (US); Baohua Qi, Columbus, IN (US)

(*) Notice: Subject to any disclaimer, the term of this patent is extended or adjusted under 35 U.S.C. 154(b) by 559 days.

(21) Appl. No.: 13/364,531

(22) Filed: Feb. 2, 2012

(65) Prior Publication Data

US 2012/0137660 A1    Jun. 7, 2012

Related U.S. Application Data

(63) Continuation-in-part of application No. 12/080,752, filed on Apr. 5, 2008, now abandoned.

(51) Int. Cl.
| | |
|---|---|
| *F01N 3/00* | (2006.01) |
| *F01N 3/10* | (2006.01) |
| *F01N 3/025* | (2006.01) |
| *F01N 3/20* | (2006.01) |
| *F01N 5/02* | (2006.01) |
| *F01N 9/00* | (2006.01) |

(52) U.S. Cl.
CPC ............ *F01N 3/103* (2013.01); *F01N 3/0253* (2013.01); *F01N 3/206* (2013.01); *F01N 3/2013* (2013.01); *F01N 3/2033* (2013.01); *F01N 5/02* (2013.01); *F01N 9/002* (2013.01); *F01N 2240/02* (2013.01); *F01N 2240/30* (2013.01); *F01N 2250/02* (2013.01); *F01N 2560/025* (2013.01); *F01N 2560/06* (2013.01); *F01N 2560/08* (2013.01); *F01N 2570/14* (2013.01); *F01N 2610/03* (2013.01); *F01N 2900/0408* (2013.01); *F01N 2900/0411* (2013.01); *F01N 2900/0416* (2013.01); *F01N 2900/0602* (2013.01); *F01N 2900/14* (2013.01); *Y02T 10/16* (2013.01); *Y02T 10/26* (2013.01); *Y02T 10/47* (2013.01)

(58) Field of Classification Search
CPC ... F01N 3/0253; F01N 3/2013; F01N 3/2033; F01N 3/206; F01N 3/103; F01N 5/02; F01N 9/002
USPC .................................................. 60/272–324
See application file for complete search history.

(56) References Cited

U.S. PATENT DOCUMENTS

| | | | |
|---|---|---|---|
| 3,775,971 A | 12/1973 | Gadefelt | |
| 5,179,838 A * | 1/1993 | Kakuta | ........................ 60/605.1 |
| 6,868,668 B2 | 3/2005 | Suzuki | |
| 6,871,489 B2 * | 3/2005 | Tumati et al. | ................... 60/285 |
| 6,895,745 B2 * | 5/2005 | Roby | ................................ 60/280 |
| 7,104,051 B2 * | 9/2006 | Shimasaki et al. | ............. 60/297 |
| 7,107,764 B1 | 9/2006 | Opris et al. | |

(Continued)

OTHER PUBLICATIONS

Author: Kusaba, H. et al.; Title of the item: Solid State Ionics; Date: 2002; pp. 689-694; Volume-issue number; 152-153; Publisher: Elsevier B.V. North-Holland; Place of publication: Netherlands.

(Continued)

*Primary Examiner* — Jesse Bogue
*Assistant Examiner* — Kelsey Stanek

(57) ABSTRACT

An aftertreatment device for reducing nitrogen oxides (NOx), particulate matter (PM), hydrocarbon (HC), and carbon monoxide (CO) generated by a compression-ignition (CI) engine. In this device, lean exhaust air generated in the CI engine is converted to rich exhaust air, and energy used for the conversion is recycled using an energy recovery device. The result rich exhaust air then pass through an oxidation catalyst, where NOx is reduced with CO and HC.

15 Claims, 16 Drawing Sheets

(56) References Cited

U.S. PATENT DOCUMENTS

| | | |
|---|---|---|
| 7,137,246 B2 * | 11/2006 | van Nieuwstadt et al. ..... 60/295 |
| 7,406,822 B2 | 8/2008 | Funke et al. |
| 7,412,822 B2 | 8/2008 | Zhan et al. |
| 7,523,606 B2 | 4/2009 | Strauser et al. |
| 7,610,751 B2 | 11/2009 | McCarthy, Jr. et al. |
| 7,673,447 B2 * | 3/2010 | Gaiser ............................ 60/289 |
| 7,735,313 B2 | 6/2010 | Osumi et al. |
| 7,775,037 B2 | 8/2010 | Ishibashi |
| 7,784,275 B2 | 8/2010 | Marlett et al. |
| 7,797,928 B2 * | 9/2010 | Friedrich et al. ............... 60/284 |
| 7,937,935 B2 | 5/2011 | Williams et al. |
| 8,043,658 B2 | 10/2011 | Phelps et al. |
| 2006/0196176 A1 * | 9/2006 | Karlsson et al. ................ 60/297 |
| 2008/0038601 A1 * | 2/2008 | Kaye ............................... 429/20 |
| 2008/0083215 A1 * | 4/2008 | Yan ................................. 60/311 |
| 2008/0141660 A1 * | 6/2008 | Kim et al. ....................... 60/286 |
| 2010/0319323 A1 | 12/2010 | Yan |
| 2011/0258986 A1 | 10/2011 | Fath |

OTHER PUBLICATIONS

Author: Heywood, J. B.; Title of the item: Internal Combustion Engine Fundamentals; Date: 1988; pp. 654-657; Publisher: McGraw-Hill; Place of publication: New York.

* cited by examiner

ENGINE AFTERTREATMENT SYSTEM WITH EXHAUST LAMBDA CONTROL

CROSS-REFERENCE TO RELATED APPLICATIONS

The present application is a continuation-in-part application of the co-pending U.S. patent application Ser. No. 12/080,752, filed on Apr. 5, 2008, now abandoned entitled Engine Aftertreatment System with Exhaust Lambda Control, to which priority is claimed under 35. U.S.C. 120.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

FIELD OF THE INVENTION

The present invention relates to systems and methods for reducing exhaust emissions from internal combustion engines, more particularly, to apparatus and methods for reducing Nitrogen Oxides (NOx), Carbon Monoxide (CO), Hydrocarbon (HC), and Particulate Matter (PM) from compression ignition engines.

BACKGROUD OF THE INVENTION

Internal combustion engines are subject to limits for exhaust emissions. In addition to improving in-cylinder designs, using Exhaust Gas Recirculation (EGR), and better controlling combustion, an aftertreatment device is normally needed for reducing pollutants, which include Nitrogen Oxides (NOx), Carbon Monoxide (CO), Hydrocarbon (HC), and Particulate Matter (PM), to required levels. In spark ignitions (SI) engines, fuel and air can be pre-mixed stoichiometrically, therefore, not much PM is seen in exhaust air, while CO, HC, and NOx are major pollutants. However, in a compression ignition CI engine, due to heterogeneous fuel-air mixing, PM and NOx are major components in its pollutants, while CO and HC are relatively insignificant.

In CI engines, PM and NOx emissions have strong relations to peak combustion temperature. High peak combustion temperature decreases PM generation while increases NOx emission, and low peak combustion temperature affects emissions reversely. Consequently, in using EGR for adjusting peak combustion temperature, a tradeoff needs to be made between PM level and NOx emission. When both of PM and NOx need to be controlled, normally, two methods are used with an aftertreatment device. One is tuning NOx emission low, and using a high efficiency filter for removing PM. The other one is tuning PM level low, and using lean NOx removing technology, such as urea/ammonia Selective Catalytic Reduction (SCR), Lean NOx Trap (LNT)/NOx Absorber (NAC), and Lean NOx Catalyst (LNC), for controlling NOx emission. In the first method, since PM level is high, the filter needs to be regenerated periodically. The regeneration normally is achieved by heating up the filter to 400° C. to 600° C., and the heating energy is provided by burning fuel in a combustion device, such as an oxidation catalyst or a burner. Fuel penalty for filter regeneration depends on engine operating conditions and NOx emission level. When a low NOx emission level is required, e.g. according to US2010 standard, NOx emission cannot be over than 0.2 g/bhp.hour, fuel penalty could be a limiting factor for using the particulate filter method.

The other method needs to remove NOx from lean exhaust air. As oxygen, NOx is also an oxidant. Therefore, a selective environment must be created more favorably for reactions reducing NOx, since oxygen concentration is much higher than that of NOx. Among all technologies used in reducing NOx in lean exhaust air, SCR has the highest conversion efficiency, and thus is used broadly. However, a difficulty in developing selective catalyst is that there exists a tradeoff between conversion efficiency and selectivity. A catalyst with high selectivity normally has poor conversion efficiency. As a result, to have high selectivity, a device with a large volume is needed when high conversion efficiency is required.

Though SCR technology needs not dosing fuel, the hydrolysis of urea, which is used in generating ammonia for SCR reactions, is endothermic and needs extra energy. If this energy is provided by burning more fuel in engine, this fuel penalty could be 3% of total engine fuel consumption, depending on operating conditions. Additionally, urea is consumed in reducing NOx. The overall cost of urea consumption and fuel penalty for urea hydrolysis is comparable with cost of fuel penalty in using particulate filter. Combining the particulate filter method and lean NOx reducing method could achieve the best aftrertreatment performance. However, the cost is system complexity and fuel penalty.

Different from that in CI engines, in SI engines, when air-fuel ratio is controlled at stoichiometric level, NOx could have a higher or comparable concentration as oxygen. As a result, even in an oxydation catalyst without good selectivity, reductant is able to remove NOx from exhaust. This type of catalyst usually is called three-way catalyst, since it uses CO and HC as reductant in removing NOx, consequently, all three pollutants are removed from exhaust.

Compared to SI engines, the lean combustion nature of CI engines creates lean exhaust air, which causes the difficulties in using reductants in exhaust air to reduce NOx. Accordingly if the lean exhaust of a CI engine is converted to rich exhaust, an oxidation catalyst can be used to reduce NOx with reductants. It is a goal of the present invention to provide a means for reducing NOx and other pollutants in lean exhaust air by converting the lean exhaust air to rich exhaust air without significantly sacrifing fuel economy. Furthermore, it is a goal of the present invention to use solely fuel in exhaust air aftertreatment.

BRIEF SUMMARY OF THE INVENTION

In the present invention, a new technology of reducing exhaust pollutants in a CI engine is developed. In this technology, oxygen is firstly removed and then an oxidation catalyst is used for reducing NOx, CO, and HC from exhaust air.

Normally, due to the lean combustion nature, air-fuel ratio in CI engines cannot be stoichiometric. In one embodiment of this invention, oxygen left in exhaust air is removed by using a fuel reactor in which fuel injected during expansion (in-cylinder late injection) or provided by a dedicated doser reacts with oxygen. The fuel reactor act as an air-fuel ratio controller, which adjusts the lambda value of the exhaust air close to 1, thus an oxidation catalyst can be used for effectively reducing NOx, CO and HC. Compared to SI engines, CI engines have better fuel economy: usually CI engines are 30% or more efficient than SI engines. Therefore, it is not economic if the dosing fuel is just used for reducing pollutants from exhaust though comparatively there could also be around 6% fuel penalty or equivalent fuel penalty when using other types of aftertreatment devices such as LNT and SCR.

Heat generated in exhaust lambda control needs to be recovered. Both turbines and heat exchange devices are energy conversion devices that can be used for energy recovery and the energy recovery efficiency determines overall fuel penalty. Ideally, if the energy recovery efficiency is higher than engine efficiency, there will be no fuel penalty in using the fuel reactor.

In another embodiment, oxygen in exhaust air is removed by using an oxygen sorption device, through which oxygen is separated from exhaust. The result rich exhaust air then passes through an oxidation catalyst where NOx, CO and HC are reduced. Once the oxygen sorption device reaches a saturation level, a regeneration process is triggered. During the regeneration, oxygen adsorbed and/or absorbed in the device is removed and the device is ready for the next sorption process. A wheel structure and/or a valve-controlled structure can be used for continuous operation.

BRIEF DESCRIPTION OF THE DRAWINGS

FIG. 2b shows the controllers in the aftertreatment system of FIG. 2a;

FIG. 5b illustrates an embodiment of the soot filter system in FIG. 5a;

DETAILED DESCRIPTION OF THE INVENTION

Figure 1:
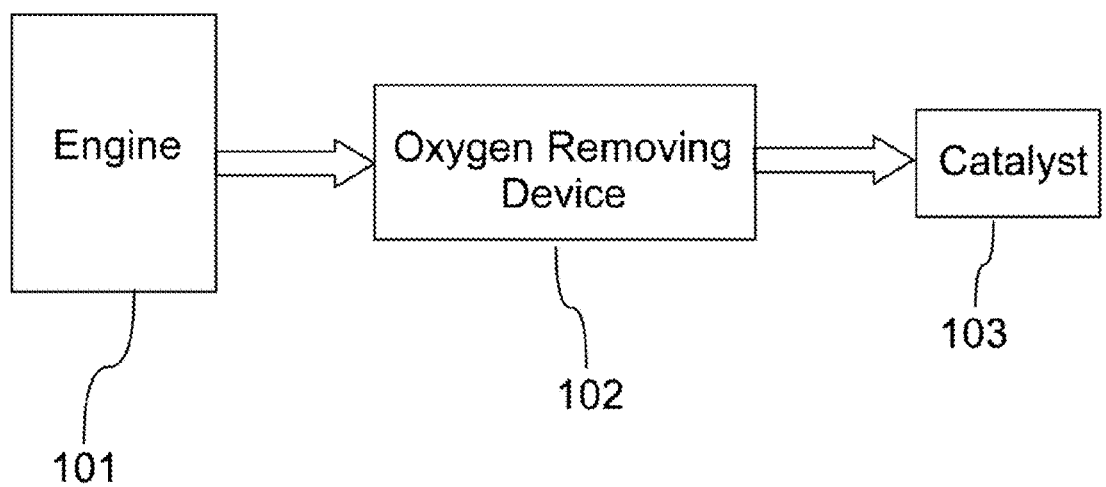
FIG. 1 is a block diagram of an aftertreatment system with an oxygen-removing device.

As depicted in FIG. 1, an engine system includes an engine 101, an oxygen-removing device 102 and an oxidation catalyst 103. The oxygen-removing device 102 is used for enriching exhaust air emitted from the engine 101. The result exhaust from the device 102 has a very low oxygen concentration. In the oxidation catalyst 103, NOx in the rich exhaust reacts with CO and HC, and thereby the pollutants are removed.

Figure 2A:
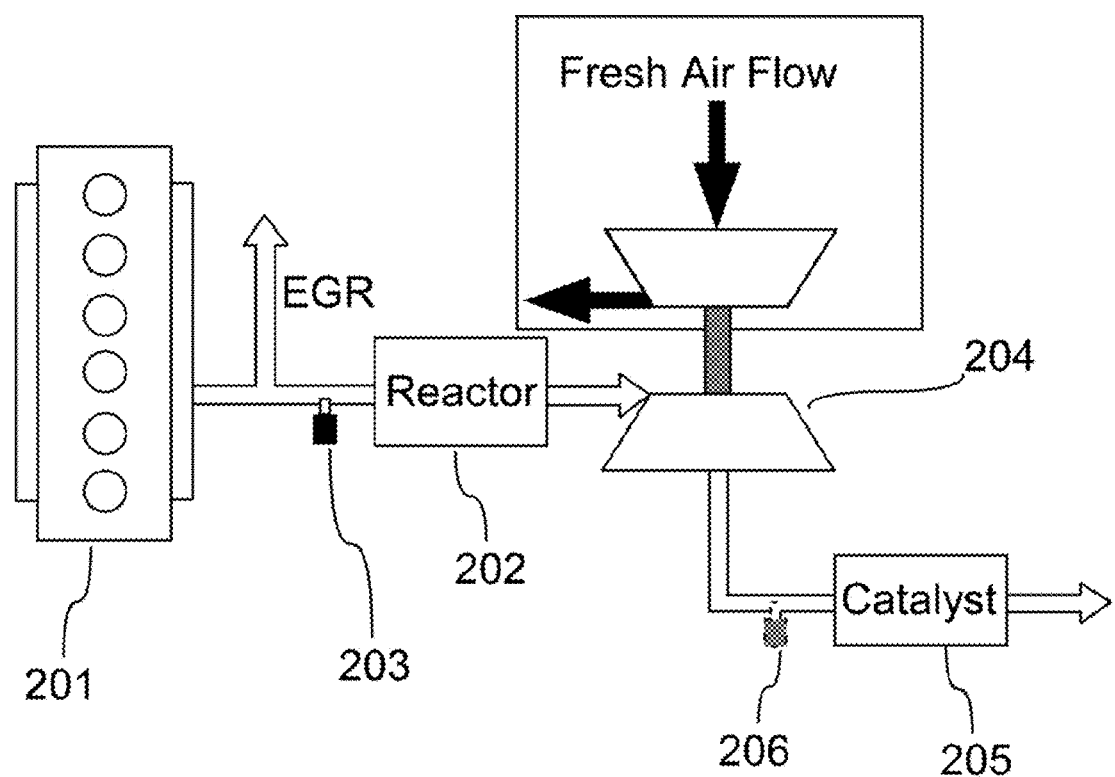
FIG. 2a illustrates an embodiment of the aftertreatment depicted in FIG. 1 with a fuel reactor for exhaust lambda control and a turbine as an energy recovery device.

An embodiment of the oxygen-removing device is shown in FIG. 2a. A fraction of the exhaust air from an engine 201 goes back to intake manifold trough an EGR system. The rest of the exhaust air goes into a fuel reactor 202. Therein HC fuel provided in in-cylinder late injection or through a fuel doser 203 reacts with oxygen in the lean exhaust emitted from the engine 201. The heated exhaust air then passes through a turbo-charger including a turbine 204, where heat energy in the exhaust air is partially recovered and used in compressing fresh air. The result exhaust air from the turbine 204 goes through a catalyst 205, where NOx reacts with CO and HC, and the treated air is emitted to ambient or to a soot filter (not shown in FIG. 2) for further removing PM. In the system, for better controlling the HC concentration in reduing NOx, or actively controlling the regeneration of the soot filter, an optional extra doser 206 can be installed between the turbine 204 and the catalyst 205. In addition to compressing fresh air, when the turbo-charger is replaced with a turbo-generator, in which the turbine 204 is used to drive an alternator, the recovered energy can be converted to electric energy. The turbo-generator is especially useful in a hybrid vehicle.

The reactor can also improve aftertreatment performance at cold-start. When engine starts, the exhaust pressure and temperature is not enough to effectively drive turbo-charger. As a result, large amount of PM could be generated. The reactor can be used for increasing the exhaust temperature and thus improves the transient performance of the turbo-charger and burns PM in exhaust air.

To effectively remove NOx, HC, and CO from exhaust air with an oxidation catalyst, the exhaust air lambda value needs to be controlled within a narrow window (Heywood, J. B., Internal Combustion Engine Fundamentals, McGraw-Hill, 1988, Page 654-657). Low lambda value facilities NOx removing, however will cause a low efficiency oxidizing HC and CO, while higher HC and CO conversion efficiency is obtained with lower NOx conversion efficiency at high lambda values. To control the exhaust lambda value at a target value $\lambda_t$, the fueling rate can be calculated using the following equation:

$$m_{fuel} = \left(\frac{m_{fresh}}{AF_0}\right)*\left(\frac{1}{\lambda_t} - \frac{1}{\lambda_1}\right) \tag{1}$$

where $\lambda_1$ is the lambda value of the engine; $m_{fuel}$ is the mass flow rate of fuel injection in exhaust lambda control, and $AF_0$ is the stoichiometric air fuel ratio.

Figure 2B:
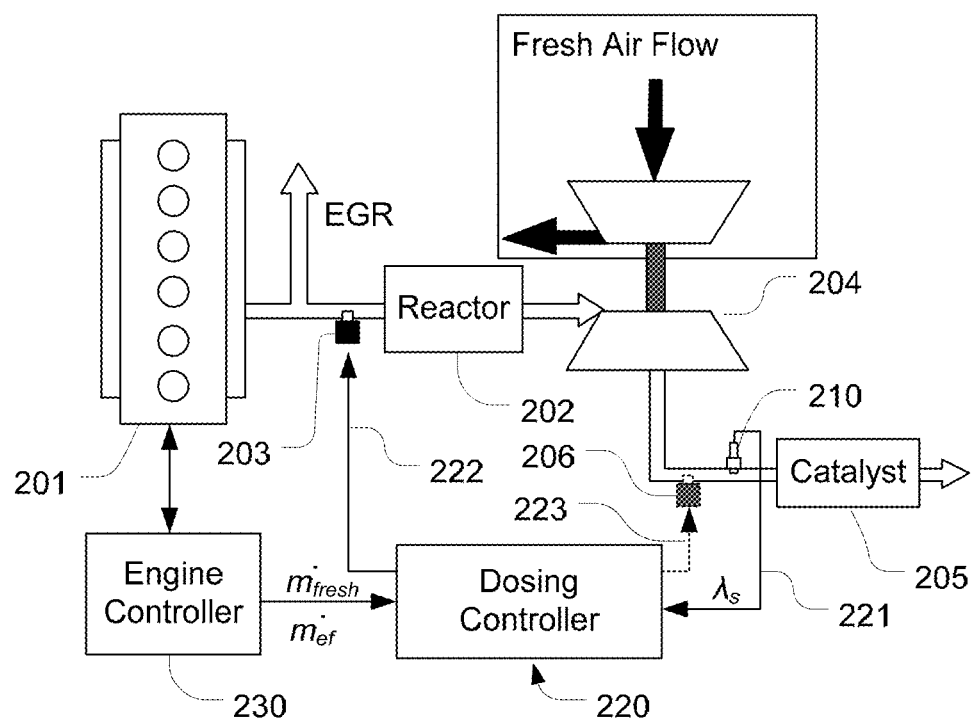

For accurately controlling the exhaust air lambda value, a feedback control can be used for a system with a lambda/oxygen sensor installed upstream the catalyst 205, as shown in FIG. 2b. In such a system, through signal lines 221, a lambda/oxygen sensor 210 is connected to a fuel dosing controller 220, which also controls the dosers 203 and 206 through signal lines 222 and 223 respectively. In generating fuel dosing commands, the exhaust air lambda value, $\lambda_s$, is monitored by using the lambda/oxygen sensor 210, and the engine lambda value and exhaust air flow rate value can be obtained either using physical sensors (not shown in FIG. 2b), or calculated using engine fueling rate $m_{ef}$ and fresh air flow rate $m_{fresh}$, provided by an engine controller 230 with the following equation:

$$\lambda_1 = \frac{m_{fresh}}{m_{ef}AF_0}. \quad (2)$$

Figure 2C:
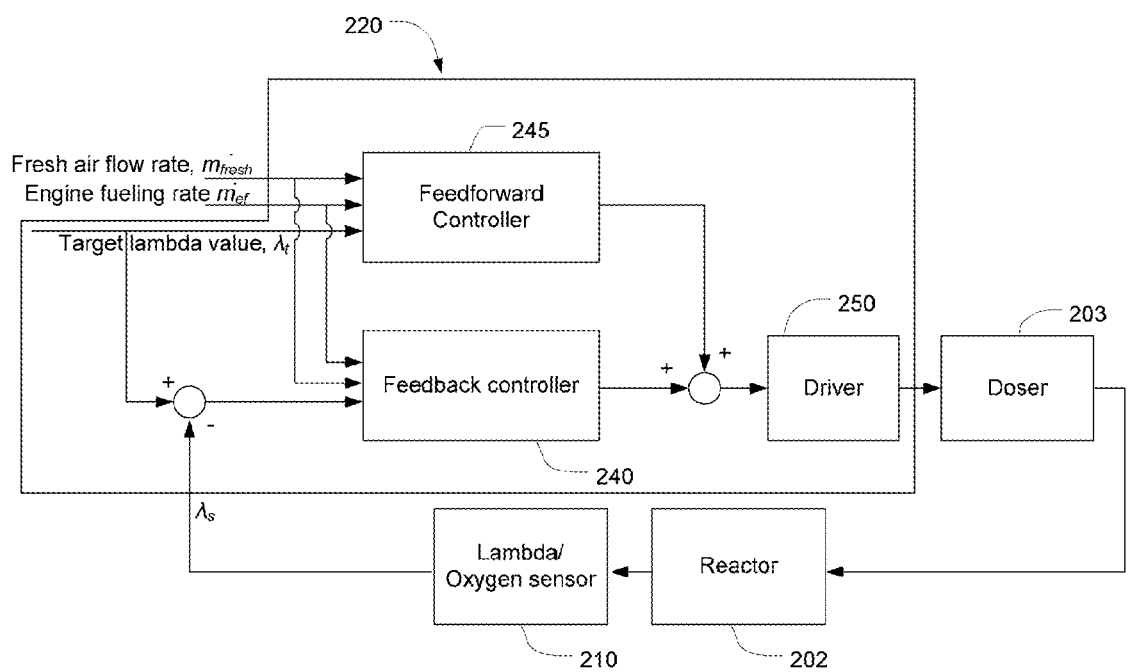
FIG. 2c is a block diagram of a control system for controlling lambda level in the aftertreatment system of FIG. 2b.

In the dosing controller 220, a variety of feedback control schemes can be used for controlling fuel dosing rate. An example of feedback control scheme for controlling the doser 203 is shown in FIG. 2c. In this control scheme, the fueling rate $m_{ef}$ together with the exhaust air flow rate $m_{exh}$ and the target lambda value A are used by a feed-forward controller 245 to calculate a baseline for the dosing rate to reach the target lambda value according to equations (1)-(2). The target lambda value $\lambda_t$ is also compared with the lambda sensing value $\lambda_s$ provided by the lambda/Oxygen sensor 210, and the error, $\lambda_t$-$\lambda_s$, is used by a feedback controller 240 to calculate a compensation value, which is added to the baseline value generated by the feed-forward controller 245. The sum value is then output to a driver 250 as a dosing command, and the driver 250 controls the doser 203 to generate the commanded dosing rate.

In the feedback controller, a gain scheduling method can be used to adjust the dynamic performance according to the fresh air flow rate and the engine fueling rate. For example, when a PID controller is used, the Proportional, Integral, and Derivative gains of the controller can be functions of the fresh air flow rate and the engine fueling rate. Also, to decrease the overshoot caused by the feedback controller, the feedback controller can further be enabled or disabled by the error $\lambda_t$-$\lambda_s$, i.e., when the error is large, only the feed-forward controller provides the dosing rate command, and when the error is decreased below certain value, the feedback controller is enabled to correct the error together with the feed-forward controller.

As a byproduct of the exhaust air lambda control, heat is released during the combustion of dosing fuel in the reactor and exhaust temperature increases. If the overall temperature gained by exhaust is $T_g$, then when fueling rate in lambda control is small compared to exhaust mass flow, we have the following equation:

$$T_g = m_{fuel}^* LHV/(C_p^* m_{exh}) \quad (3)$$

where LHV is the low heating value of fuel; $C_p$ is the specific heat at constant pressure, and $m_{exh}$ is the exhaust mass flow, $$m_{exh} = m_{ef} + m_{fuel} + m_{fresh} \quad (4)$$

Based on equations (1), (3), and (4), when the value of fresh air flow, the exhaust temperature increase across the reactor is $$T_g = \left(\frac{1}{\lambda_t} - \frac{1}{\lambda_1}\right)\frac{\lambda_t LHV}{C_p(\lambda_t AF_0 + 1)} \quad (5)$$

According to the equation (5), with a given target lambda value, the temperature gained by the exhaust air is determined by the engine lambda value. When the engine lambda value is low, a high temperature can be generated. Consequently, the engine lambda value needs to be carefully controlled, otherwise, a complex and expensive reactor and turbo that can work at high temperature are needed. In addition to tuning EGR fraction, a heat exchanger or multi-stage turbine can be used for lowering the temperature at turbine inlet.

Figure 3:
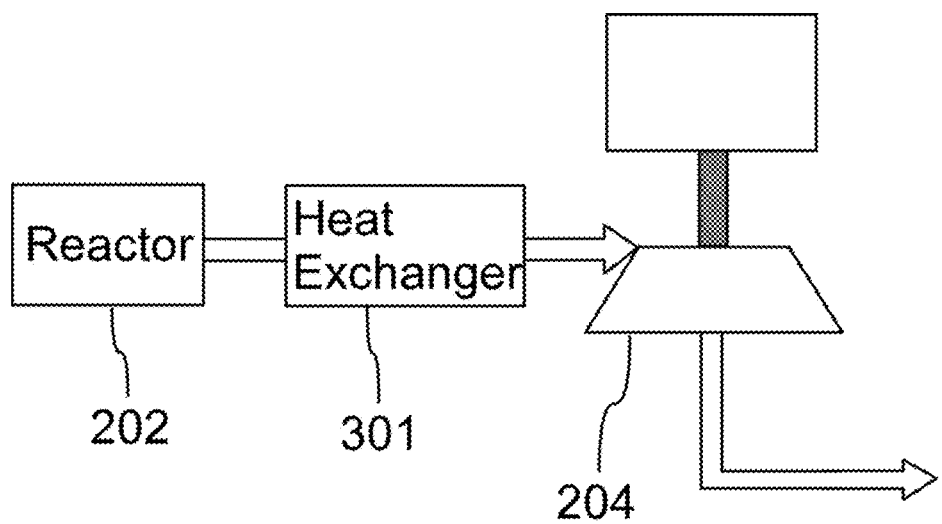
FIG. 3 shows the aftertreatment system of FIG. 2 further including a heat exchanger.

As depicted in FIG. 3, a heat exchanger 301 is used in between the fuel reactor 202 and the turbine 204 for decreasing the temperature of the exhaust air passing through it. A heat pump (not shown in the figure) can be used with the heat exchanger 301 for recovering the heat energy.

Figure 4:
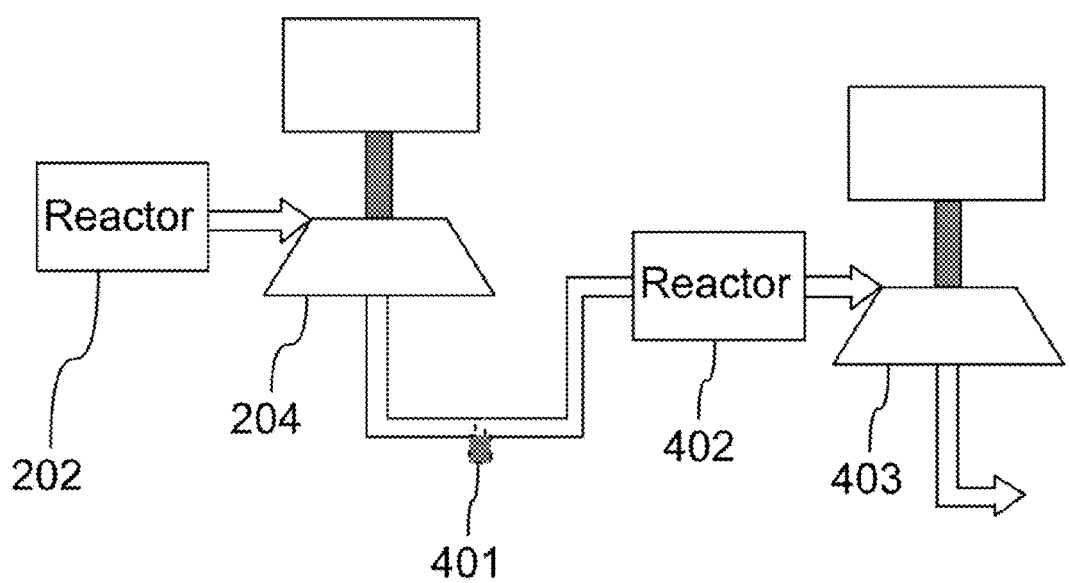
FIG. 4 depicts an aftertreatment with multiple fuel reactors and multiple turbines.

Another method for lowering the turbine inlet exhaust temperature is using multi-stage turbines. As shown in FIG. 4, a second stage turbine 403 is positioned downstream from the turbine 204. In between the turbine 403 and the turbine 204, a fuel reactor 402 is used for further lambda control, and a doser 401 can be used for flexibly controlling the temperature of exhaust air passing through the turbine 403. Since the lambda value downstream from the turbine 403 is controlled by both of the reactors 202 and 402, the exhaust temperature upstream from the turbine 204 can be decreased by distributing the lambda control in between the reactors 202 and 402, i.e., the lambda value downstream from the reactor 202 can be controlled higher, resulting a lower exhaust air temperature upstream and then downstream from the reactor 202, and the fuel reactor 402 is used for further controlling the lambda value down to the stoichiometric level. More turbines can be used for flexibly distributing heat generated in lambda control, if engine back pressure, cost and recover efficiency allow.

The exhaust air with lambda controlled at stoichiometric level flows into an oxidation catalyst, where HC and CO in the exhaust react with NOx and generate $N_2$, $CO_2$, and $H_2O$. To remove PM in the exhaust air, referring to FIG. 5a, a soot filter system 502, which includes a DOC (Diesel Oxidation Catalyst) and a DPF (Diesel Particulate Filter), is installed in between the turbine 204 and an oxidation catalyst 503.

Normally the soot filter system 502 needs to be regenerated after the amount of PM deposited in the DPF exceeds a certain level. During regeneration, the exhaust lambda value at the inlet of the soot filter 502 cannot be controlled below 1.0, otherwise, soot in the filter is not able to be effectively removed, since oxygen in the exhaust is not enough for soot oxidation. To have an uninterrupted deNOx operation, a doser 501 can be used for further controlling lambda during filter regeneration, in which the fuel injected from the doser 501 reacts with the oxygen left in the regeneration in the front area of the catalyst 503 for lowering lambda to stoichiometric level.

Through turbines, heat energy is recovered into mechanical energy or electric energy. When the energy recovery efficiency is $\eta_r$, we can define the fuel penalty $r_p$ as the ratio of the net fuel loss in lambda control and the overall fueling, i.e.:

$$r_p = m_{fuel} * \frac{\eta_e - \eta_r}{m_{fuel} + m_{ef}} \quad (6)$$

where $\eta_e$ is the engine energy efficiency. According to equations (1), (2) and (6), the fuel penalty can be calculated in using the following equation:

$$r_p = \left(1 - \frac{\lambda_t}{\lambda_1}\right)(\eta_e - \eta_r) \quad (7)$$

The equation (7) shows that the fuel penalty actually is determined by the engine out exhaust lambda value and the difference between the energy recovery efficiency and the engine efficiency. As an example, if $\lambda_1$=1.4, and $\lambda_t$=1.0, then to have a fuel penalty of 5%, which is normally the value of an DPF system, assuming engine energy efficiency is 40%, the required energy recovery efficiency will be only 22.5%. If a turbine system has an energy recovery efficiency higher than 40%, there will be no fuel penalty.

Figure 5A:
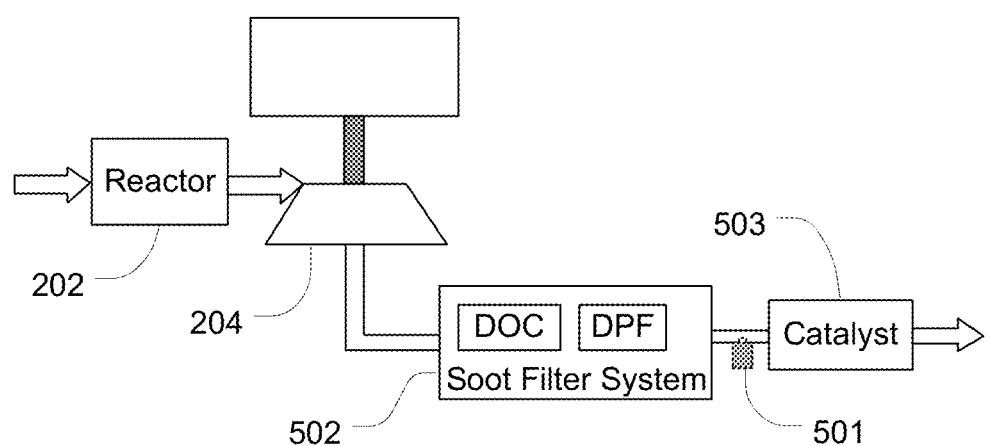
FIG. 5a is a block diagram of the aftertreatment system depicted in FIG. 2 further including a soot filter system.
Figure 5B:
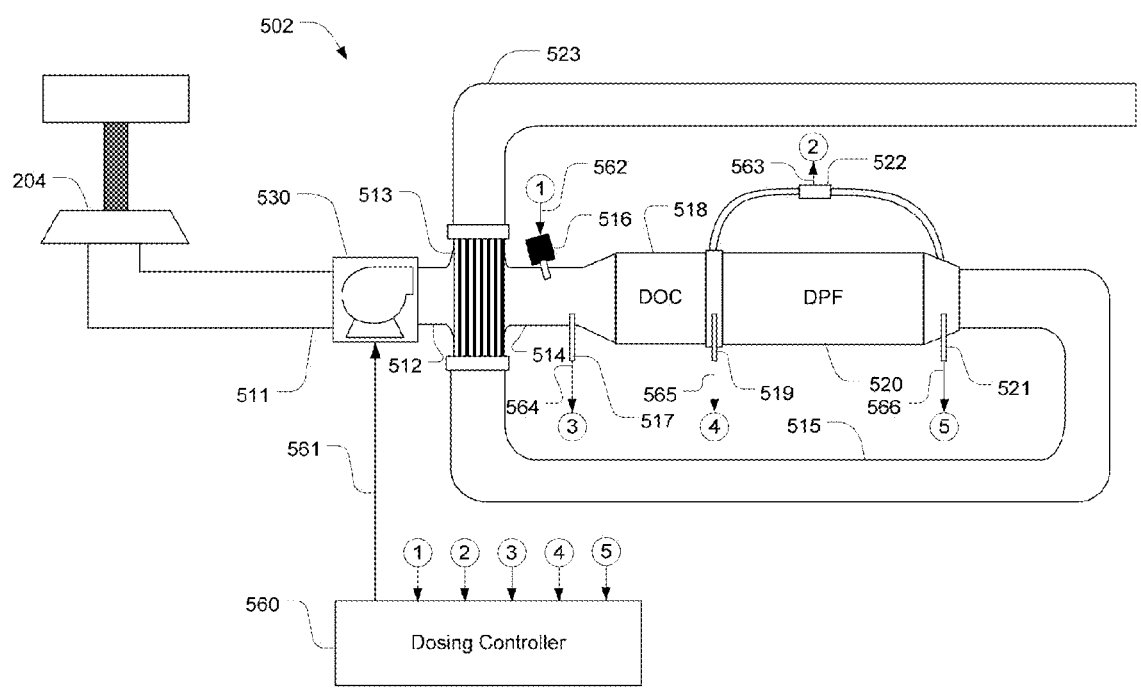

In the system of FIG. 5a, heat energy can also be recovered using a heat exchanger when regenerating the soot filter system 502. As depicted in FIG. 5b, in the soot filter system, an air compressor 530, which is controlled by a dosing controller 560 through signal lines 561 has its inlet (low pressure side) fluidly connected to the outlet of the turbine 204 via a passage 511, and its outlet (high pressure side) fluidly connected to the shell inlet of a heat exchange device 513 through a passage 512. The shell outlet of the heat exchange device 513 is fluidly connected to a DOC 518 through a passage 514, on which a temperature sensor 517 is mounted and linked to the dosing controller via signal lines 564. A fuel doser 516, which is controlled by the dosing controller 560 through signal lines 562, is also installed on the passage 514 upstream the temperature sensor 517 for delivering fuel to exhaust air flowing through the DOC 518. A DPF is positioned downstream the DOC 518 for removing particulate matters in exhaust air, and a delta pressure sensor 522 is used to measure the pressure drop across the DPF and report sensing values to the dosing controller 560 via signal lines 563. A temperature sensor 519, positioned in between the DOC 518 and the DPF 520 and connected the dosing controller 560 through signal lines 565, and another temperature sensor 521, positioned downstream the DPF 520 and connected to the dosing controller 560 through signal lines 566, are used to monitor the temperature at the inlet and the outlet of the DPF respectively. Exhaust air passing through the DPF is introduced back to the tube inlet of the heat exchanger 513 through a passage 515, and the tube outlet of the heat exchanger 513 is fluidly connected to a passage 523 to release exhaust air to the catalyst 503 (FIG. 5a).

In this system, PM deposited in the DPF 520 increases its restriction to exhaust air flow, resulting in higher pressure drop across the DPF. When the restriction indicated by the pressure drop, which is measured using the pressure sensor 522, is higher than a threshold, a regeneration process is triggered. In the regeneration, after the light-off temperature of the DOC 518 is reached, hydrocarbon fuel is delivered by the doser 516 into a lean exhaust air. In the DOC 518, the hydrocarbon fuel reacts with oxygen in the lean exhaust air releasing heat energy, and the heated exhaust air passes through the DPF 520, burning off the PM inside it. The exhaust air then goes back to the heat exchanger 513 through the passage 515. Therein the exhaust air in the tube loses heat energy to the exhaust air in the shell and goes out into the catalyst 503 (FIG. 5a) through the passage 523.

During the regeneration process, the DOC inlet temperature and outlet temperature measured by using the temperature sensors 517 and 519 are used in determining the amount of dosing fuel needed to increase the exhaust air temperature to a target value for effectively oxidizing the PM in the DPF, and the DPF outlet temperature measured by using the temperature sensor 521 is used for adjusting the fuel dosing rate to avoid overly heating the DPF. To decrease energy consumption, the heat exchanger 513 needs to have a high heat exchanging efficiency, and thus a long resident time of the exhaust air in the heat exchanger, resulting in increase of pressure drop across the heat exchanger. The pressure drop across the heat exchanger 513 and DPF may cause a high backpressure to the engine, deteriorating fuel economy. To decrease the effects of pressure drop across the heat exchanger 513 and the DPF 520, the exhaust air compressor 530 is used to control the engine backpressure. The exhaust air compressor 530 provides a pressure increase, which compensates the pressure drop caused by the exchanger 513, the DPF 520, and the catalyst 503 (FIG. 5a). When pressure increase equals to the pressure drop, then the pressure at the passage 511 is ambient pressure, and thereby the backpressure to the engine is the same as that in a system without after-treatment devices. In addition to being positioned downstream from the turbine 204 as shown in FIG. 5b, the exhaust air compressor 530 can also be positioned upstream the turbine 204 or combined with the turbine 204.

Figure 5C:
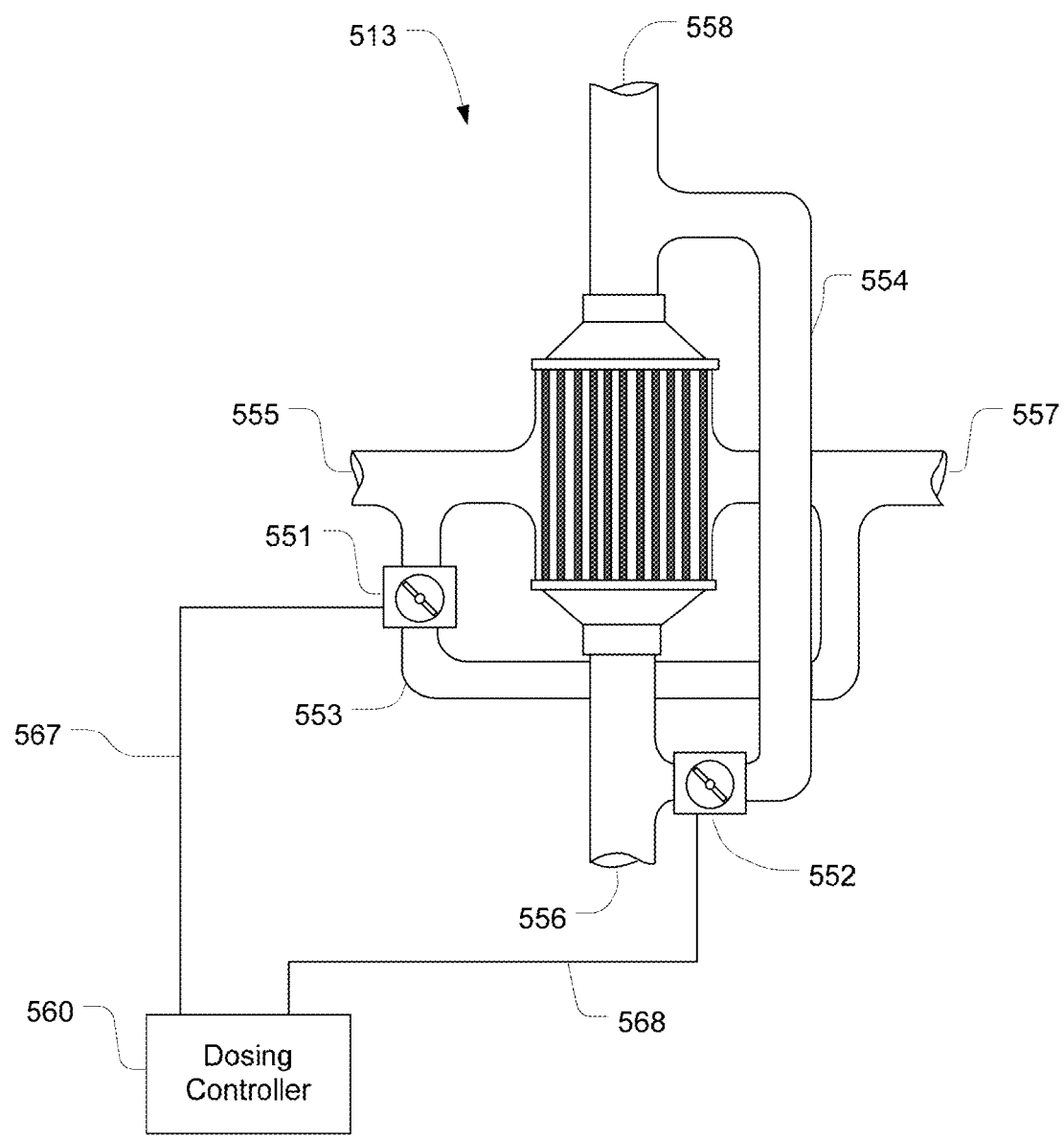
FIG. 5c shows a heat exchanging device in the soot filter system of FIG. 5b further including bypass valves.

When the doser 516 is used solely for regenerating the DPF 520, the heat exchange device 513 is only needed during a regeneration. To decrease the engine backpressure and energy cost in controlling the engine backpressure, the heat exchange device 513 can be bypassed in normal operations. Referring to FIG. 5c, in the exchange device 513, through a passage 553, the air flow in which is controlled by a valve 551, the shell inlet 555, which is connected to the high pressure outlet of the exhaust air compressor 530 through a passage 512 (FIG. 5b), is fluidly coupled to the shell outlet 557, which is connected to the DOC 518 through a passage 514 (FIG. 5b). Similarly, the tube inlet 556, which is connected to the DPF 520 through a passage 515 (FIG. 5b), is fluidly coupled to the tube outlet 558, which is connected to the passage 523 (FIG. 5b), through a passage 554 and a control valve 552. The control valves 551 and 552 are controlled by the dosing controller 560 via signals lines 567 and 568 respectively. In normal operations, the valves 551 and 552 are open, since the restriction to exhaust air flow in the passages 553 and 554 is lower than that in the shell and tube in the heat exchanger 513, the pressure drop is lowered. When a regeneration is triggered, the valves 551 and 552 are closed, and the exhaust air flows through the shell and tube in the heat exchanger 513 with heat energy being transferred from the exhaust air downstream from the DPF to that upstream from the DOC.

Figure 5D:
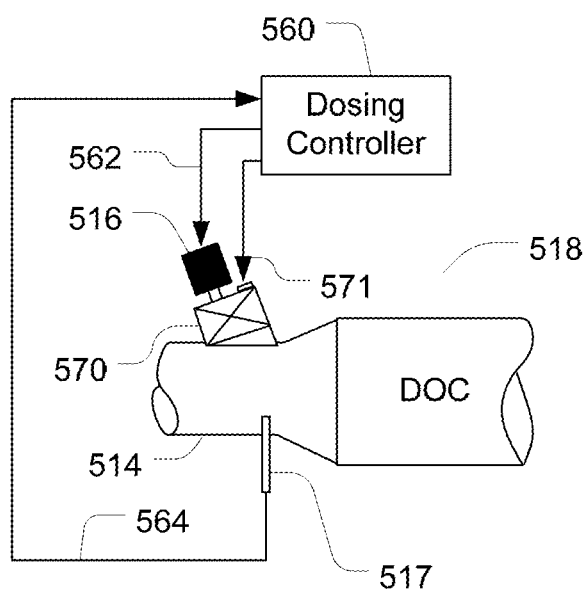
FIG. 5d shows a fuel doser in the soot filter system of FIG. 5b further including an electrical heater for heating dosing fuel.
Figure 5E:
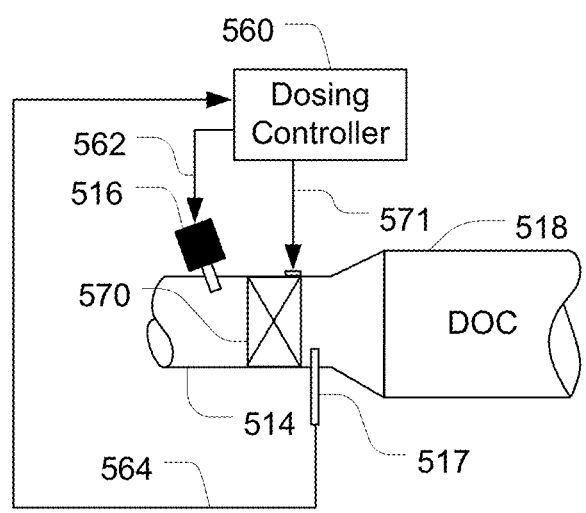
FIG. 5e shows a fuel doser in the soot filter system of FIG. 5b further including an electrical heater for heating exhaust air mixed with dosing fuel.
Figure 5F:
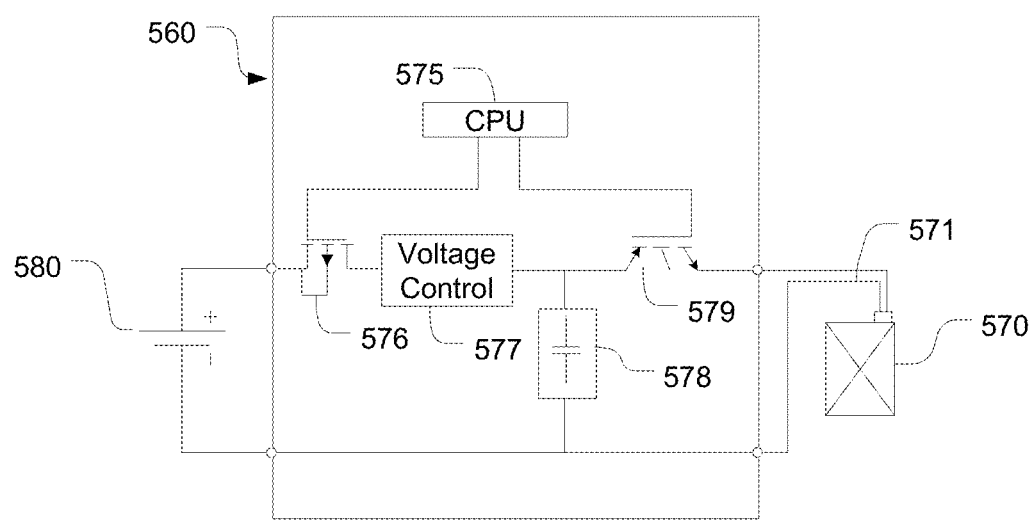
FIG. 5f shows a pulse controller for controlling electrical heaters.

To effectively oxidize fuel in the DOC 518, the exhaust air temperature needs to be higher than the DOC light-off temperature, which is normally around 250° C., otherwise, unburned fuel may slip the DPF. The light-off temperature limit causes the system unable to start dosing for low temperature exhaust air even if a regeneration is triggered. To solve this problem, a positive feedback process can be introduced by momentarily heating the dosing fuel or the DOC 518 with a second heating device in addition to the exhaust gas heating device which includes the doser 516 and the DOC 518 to "jump start" the heating process. In an exemplary system, as shown in FIG. 5d, an electrical heater 570, controlled by the dosing controller 560 through signal lines 571, can be used as the second heating device to heat the fuel released by the doser 516 to a temperature higher than the light-off temperature. The heated fuel is then partially oxidized in the exhaust air and enters the DOC 518, where it is fully oxidized, releasing more heat and warming up the exhaust air and the DOC. Through the heat exchanger 513 (FIG. 5b), the released heat is transferred back to the exhaust air entering the DOC 518, which is further warmed up with dosing fuel being burned in exhaust air with higher temperature. When the heat energy released in the DOC 518 equals to the heat loss to the exhaust air, the DOC temperature is then able to be hold above the light-off temperature, and the electrical heating is turned off. To decrease the effects of heat loss from the heated fuel to the exhaust air and DOC 518, the electrical heater can be positioned in front of DOC with exhaust air passing through, as depicted in FIG. 5e. In this case, a higher heating power is needed. To decrease the burden on batteries, a pulse driving signal can generated to the heater by charging and discharging a capacitor. As shown in FIG. 5f, inside the dosing controller 560, a MOSFET switch 576 controlled by a CPU 575 connects a power source (a battery 580) to a capacitor array 578 through a voltage control circuit 577, which is used to provide appropriate voltage to the capacitor array 578. An IGBT switch 579, which is also controlled by the CPU 575, is used to connect the capacitor array 578 to the electrical heater 570 through signal lines 571. In normal operations, the two switches 576 and 579 are at OFF state, disconnecting the capacitor array 578 to the battery 580 and to the electrical heater 570. When a regeneration process is triggered and the exhaust flow temperature is low, the heater control is activated. The switch 576 is firstly energized ON, charging the capacitor array 578. When the capacitor voltage is higher than a threshold, upon a firing command, the switch 576 is turned OFF and the switch 579 is latched ON, discharging the capacitor array through the electrical heater 570. With the high discharging current, the heater temperature increases, heating dosing fuel and exhaust air pass through it. The heated dosing fuel is then further oxidized in the DOC 518 (FIG. 5*b*), releasing more heat there. Before the DOC 518 is cooled down by the exhaust air, another heating pulse is generated. Thereby the DOC temperature increases, until it reaches light-off temperature, and then the heater control is de-activated. During the heater control, fuel dosing, which is normally controlled with a PWM method, needs to be synchronized with the heating pulse, i.e., a heating pulse is generated when a dosing pulse is generated, to avoid unburned HC slipping the DOC 518 and the DPF 520 (FIG. 5*b*). If the battery 580 is able to provide enough power for high exhaust flow, or only low electrical power is required, e.g., when a regeneration is only required at some special engine operating modes with low exhaust air flow, the electrical heater 570 can be used without dosing fuel in regenerating the DPF 520. In this case, a smaller DOC or no DOC is required.

Figure 5G:
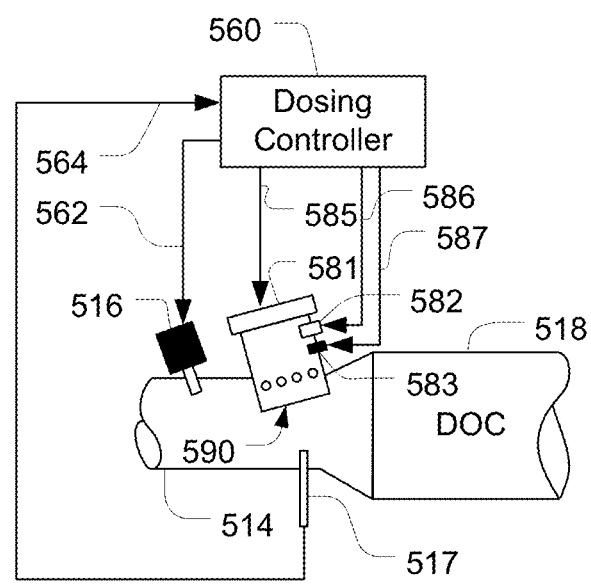
FIG. 5g shows a fuel doser in the soot filter system of FIG. 5b further including a fuel burner for heating exhaust air mixed with dosing fuel.

In addition to electrical heaters, fuel burners can be used for heating exhaust air as well with low temperature exhaust air. Referring to FIG. 5*g*, in such as system, a fuel burner 590 is positioned in between the shell outlet of the heat exchanger 513 and the DOC 518. The fuel burner 590 has an air blower 581 fluidly connected to a fresh air supply, and a fuel pump 582 fluidly connected to a fuel supply. The air blower 581 and the fuel pump 582 are controlled by the dosing controller through signal lines 585 and 586 respectively. A glow plug 583 controlled by the dosing controller 560 through signal lines 587 is used to ignite dosing fuel. As the electrical heater 570 (FIG. 5*d* and FIG. 5*e*), the fuel burner 590 can be used for either boosting up the exhaust temperature temporarily for the DOC 518 to reach and sustain light-off temperature, or for directly regenerating the DPF 520 (FIG. 5*b*) without dosing fuel to the DOC. When a fuel burner is used for temporarily heating the DOC 518 to jump start a DOC combustion, the doser 516 is needed to delivery fuel to the DOC. In applications using a fuel burner directly providing high temperature exhaust air, the doser 516 is not required. The DOC 518 can be used for operations with exhaust air temperature higher than the light off temperature, when the fuel burner 590 acts as a fuel doser with glow plug de-energized off, or a smaller DOC or no DOC is needed when the fuel burner 590 is used as the only heating means. Just since normally a fuel burner needs a fresh air supply to avoid generating too much PM during combustion, an extra amount of fuel is needed for heating the fresh air supply, resulting in higher energy cost. Compared to electrical heaters, fuel burners need a more complex control system for delivering fuel and air supply in combustion control, and therefore, have higher device cost.

Figure 6:
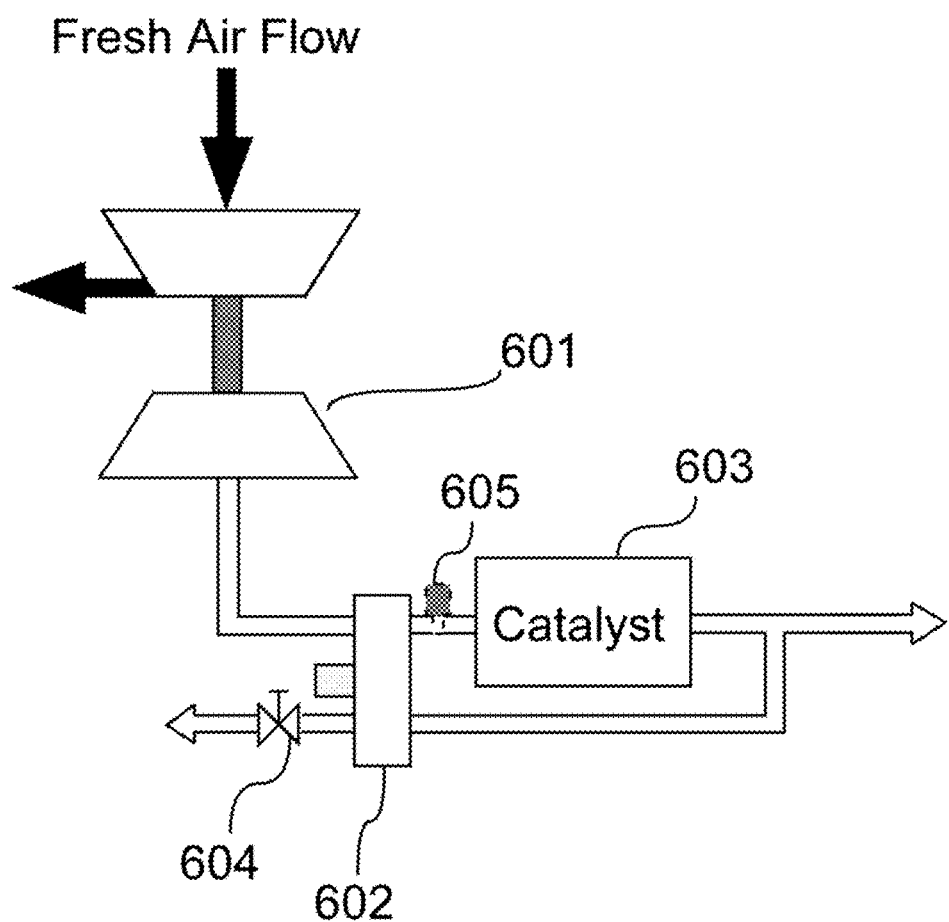
FIG. 6 illustrates another embodiment of the aftertreatment depicted in FIG. 1 with an oxygen sorption device.

Referring back to FIG. 1, in addition to combustion, oxygen sorption devices can also be used in the oxygen removing device 102. As shown in FIG. 6, in such as system, an oxygen sorption device 602 is connected to a turbo-charger 601. Exhaust air flows through the device 602, where oxygen in the exhaust flow is absorbed and/or adsorbed and thereby, lambda is controlled to stoichiometric level. The result exhaust air then flows into a catalyst 603, therein NOx reacts with the HC and CO in the exhaust and then is reduced. Hydrocarbon level in the exhaust can be controlled by either using in-cylinder late injection, or using an external doser 605. The clean rich exhaust processed by the catalyst 603 is emitted to ambient, and a fraction of this exhaust is fed back to the oxygen sorption device 602 for device regeneration. To decrease the energy consumed in regeneration, a valve 604 is used for controlling airflow.

Figure 7:
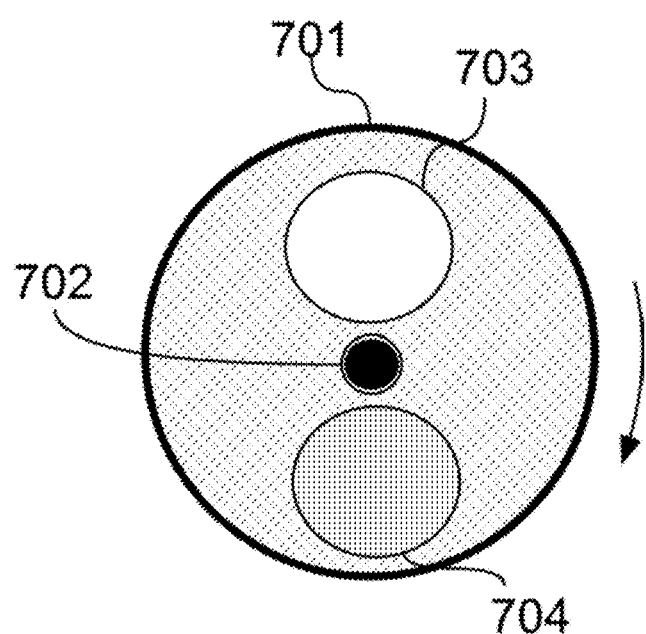
FIG. 7 shows the oxygen sorption device of FIG. 6 with a wheel structure.

The structure of an embodiment of the oxygen sorption device 602 is depicted in FIG. 7. This device includes a rotating apparatus 701 driven by actuator 702, a working area 703 and a regeneration area 704 both having oxygen sorption materials. Firstly the working area 703 in the device 602 is in the exhaust stream absorbing and/or absorbing oxygen from exhaust air, and thus the lambda is controlled at the stoichiometric level. When the oxygen sorption material in the working area 703 reaches its saturation level, the actuator 702 is energized and drives the rotating apparatus 701 moving the working area 703 to the position of the regeneration area 704 and turning the regenerated area 704 into the exhaust stream for oxygen sorption. The oxygen sorption material in the regeneration area (previous working area) is then regenerated in the rich air fed back from the outlet of the catalyst 603 (the rich air flow rate is controlled by the valve 604). The process repeats for continuous oxygen level control.

A variety of materials can be used for absorbing and/or adsorbing oxygen. Among them, perovskite-related oxides has a good oxygen sorption capacity at temperature range of 200° C. to 400° C., and can be regenerated at temperature at 600° C. [Kusaba, H., Sakai, G., Shimanoe, K., Miura, N., Yamazoe, N., Solid State Ionics, 152-153 (2002)689-694]. Extra energy is needed in regenerating the oxygen absorption material and in rotating the device. This part of energy contributes to the overall fuel penalty for exhaust aftertreatment.

Figure 8:
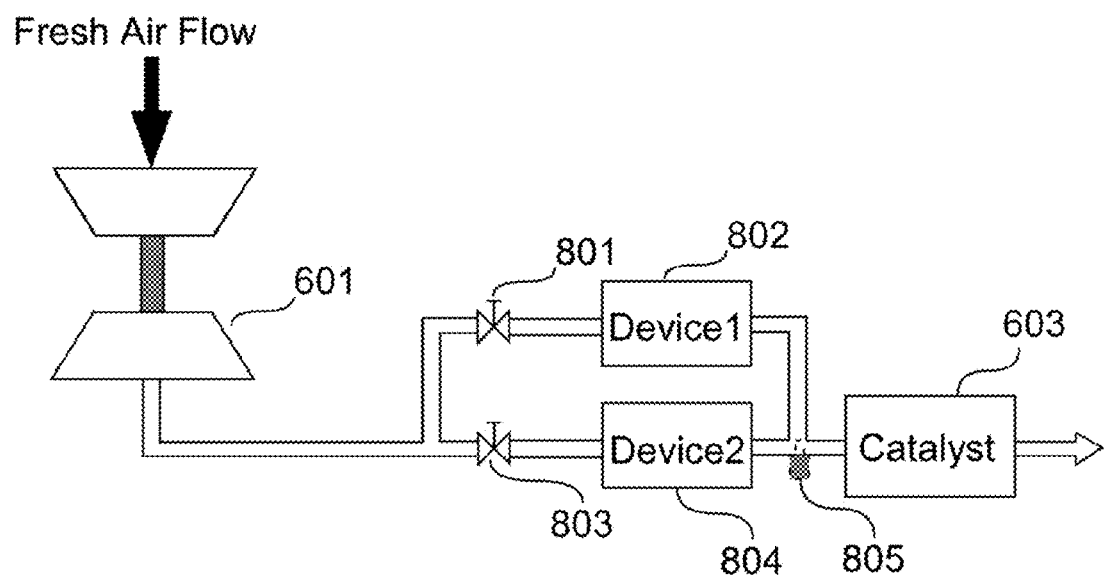
FIG. 8 shows an aftertreatment of FIG. 6 controlled with valves.

In addition to the rotating device, a valve-controlled system can also be used for removing oxygen in exhaust air. In such a system, as depicted in FIG. 8, two oxygen sorption devices: devices 802 and 804 are used together with two control valves 801 and 803 for oxygen level control. At beginning, the control valve 801 is off and the control valve 803 is on. Exhaust flow from the turbocharger 601 passes through the device 804 and has oxygen removed therein. The result exhaust then goes into the catalyst 603 and NOx is reduced by HC and CO. An HC doser 805, which in FIG. 8 is positioned in between the oxygen removing devices and the catalyst, can be used for flexibly controlling the reactions. When the device 804 is saturated, the control valve 803 is shut off and the control valve 801 is turned on. The device 802 is then used for passing exhaust air through and the device 804 is regenerated for next cycle. The two oxygen control devices work alternatively in continuous oxygen level control.

For better removing NOx, referring to FIG. 1, the catalyst 103 may include an LNT. In this system, when the lambda is not controlled at the stoichiometric level during some transient operations, the LNT then is able to remove NOx in exhaust air. When lambda is back to stiochiometric level, the LNT is regenerated by dosing with HC.

One skilled in the art will appreciate that the present invention can be practiced by other than the preferred embodiments which are presented in this description for purposes of illustration and not of limitation, and the present invention is limited only by the claims that follow. It is noted that equivalents for the particular embodiments discussed in this description may practice the invention as well.

The invention claimed is:

1. An emission control apparatus for an engine comprising:
   a catalyst in which NOx in exhaust air is effectively reduced through direct reactions with hydrocarbon and carbon monoxide in an air-to-fuel ratio window with its lower bound lower than a stoichiometric air-to-fuel ratio and its upper bound higher than said stoichiometric air-to-fuel ratio;
   at least one combustion device positioned upstream from said catalyst with a fuel supply configured to enrich lean exhaust air produced from said engine;
   at least one energy conversion device for converting heat energy into other forms of energy;
   a Diesel Particulate Filter (DPF) downstream from the combustion device and upstream of the catalyst for removing particulate matter produced from said engine;
   a heat exchanging device including a first inlet configured to receive an exhaust air flow, a second inlet fluidly coupled to an outlet of said DPF, a fist outlet fluidly coupled to an inlet of said combustion device, and a second outlet configured to release said exhaust air flow;
   a first bypass valve with its inlet fluidly connected to said first inlet of said heat exchanging device, and its outlet fluidly connected to said first outlet of said heat exchanging device;
   a second bypass valve with its inlet fluidly connected to said second inlet of said heat exchanging device, and its outlet fluidly connected to said second outlet of said heat exchanging device;
   a bypass controller configured to close said first bypass valve and said second bypass valve in said process for regenerating said DPF;
   a feedback oxygen sensor positioned downstream from said combustion device providing downstream sensing signals indicative to an air-to-fuel ratio of an exhaust air flow produced by said engine; and
   a system controller configured to reduce NOx from said exhaust air flow passing through said catalyst by controlling a fuel delivering rate of said fuel supply to said combustion device to maintain said air-to-fuel ratio of said exhaust air flow within said air-to-fuel ratio window, in response to at least said downstream sensing values obtained from said feedback oxygen sensor, and a mass flow rate of exhaust air produced from said engine, when a NOx level in said exhaust air flow produced by said engine is higher than a predetermined value determined by an emission regulation.

2. The emission control apparatus of claim 1, wherein said system controller is further configured to use an air-to-fuel ratio of said engine to control said fuel delivering rate of said fuel supply.

3. The emission control apparatus of claim 2, further comprising:
   a feed-forward oxygen sensor positioned in-between said engine and said combustion device providing upstream sensing values indicative of said air-to-fuel ratio of said engine.

4. The emission control apparatus of claim 2, wherein said system controller is further configured to control said fuel delivering rate of said fuel supply by integrating a feed-forward control signal, which is produced by a feed-forward control loop in response to at least said upstream sensing values provided by said feed-forward oxygen sensor, together with a feedback correction control signal, which is generated by a feedback control loop according to a difference between a target value determined by said air-to-fuel ratio window and said downstream sensing values obtained from said feedback oxygen sensor.

5. An emission control apparatus for an engine comprising:
   a Diesel Particulate Filter (DPF) for removing particulate matter produced from said engine;
   a first heating device including a Diesel Oxidation Catalyst (DOC) positioned upstream from said DPF;
   a dosing device with an injector positioned upstream from said DOC and downstream from said engine for delivering a hydrocarbon fuel in dosing pulses into an exhaust air flow;
   a second heating device including a heating element positioned downstream from said injector of said dosing device for heating said hydrocarbon fuel delivered by said dosing device above its light-off temperature before it is mixed with said exhaust air flow;
   a heat exchanging device including a first inlet configured to receive an exhaust air flow, a second inlet fluidly coupled to an outlet of said DPF, a first outlet fluidly coupled to an inlet of said DOC, and a second outlet configured to release said exhaust air flow;
   a first bypass valve with its inlet fluidly connected to said first inlet of said heat exchanging device, and its outlet fluidly connected to said first outlet of said heat exchanging device;
   a second bypass valve with its inlet fluidly connected to said second inlet of said heat exchanging device, and its outlet fluidly connected to said second outlet of said heat exchanging device;
   a bypass controller configured to close said first bypass valve and said second bypass valve in said process for regenerating said DPF;
   a temperature sensing means for generating temperature sensing signals indicative to a temperature of said DOC; and
   a preheating controller configured to generate a driving signal in a process for regenerating said DPF, energizing said heating element of said second heating device in response to said dosing pulses delivered by said dosing device when said temperature sensing values obtained from said temperature sensing means are lower than a first predetermined threshold, and de-energizing said heating element of said second heating device when said temperature sensing values are higher than a second predetermined threshold.

6. The emission control apparatus of claim 5, wherein said driving signal is a pulse signal.

7. The emission control apparatus of claim 5, wherein said heating element is an electrical heater and said pre-heating controller is further configured to generate a pulse control signal energizing and de-energizing said electrical heater by discharging and charging a capacitor array, which includes at least one capacitor.

8. The emission control apparatus of claim 5, wherein said heating element of said second heating device is a fuel burner with a fresh air supply, a fuel supply, and an ignition control means for controlling igniting operations.

9. The emission control apparatus of claim 1, further comprising:
   an air compressing means positioned in said exhaust flow upstream from said heat exchanging device; and
   a pressure controller configured to operate at least said air compressing means in controlling a back pressure of said engine below a predetermined limit value.

10. An emission control apparatus for an engine comprising:
- a Diesel Particulate Filter (DPF) for removing particulate matter from exhaust air;
- a Diesel Oxidation Catalyst (DOC) positioned upstream from said DPF for oxidizing hydrocarbon and carbon monoxides;
- an exhaust air compressing means for producing a higher pressure exhaust flow from a low pressure inlet configured to receive a low pressure exhaust air flow and a high pressure outlet for releasing a compressed exhaust air flow;
- a heat exchanging device including a first inlet configured to receive said compressed exhaust air flow released from said air compressing means, a second inlet fluidly coupled to an outlet of said DPF, a first outlet fluidly coupled to an inlet of said DOC, and a second outlet configured to release said compressed exhaust air flow;
- a first bypass valve with its inlet fluidly connected to said first inlet of said heat exchanging device, and its outlet fluidly connected to said first outlet of said heat exchanging device;
- a second bypass valve with its inlet fluidly connected to said second inlet of said heat exchanging device, and its outlet fluidly connected to said second outlet of said heat exchanging device;
- a bypass controller configured to close said first bypass valve and said second bypass valve in said process for regenerating said DPF; and
- a pressure controller configured to operate at least said exhaust air compressing means in controlling a back pressure of said engine below a predetermined limit value.

11. The emission control apparatus of claim 10, further comprising:
- a NOx removal catalyst positioned downstream from said heat exchanging device having NOx effectively reduced inside through direct reactions with hydrocarbon and carbon monoxide in an air-to-fuel ratio window with its lower bound lower than a stoichiometric air-to-fuel ratio and its upper bound higher than said stoichiometric air-to-fuel ratio;
- at least one combustion device positioned upstream from said NOx removal catalyst with a fuel supply configured to enrich lean exhaust air produced from said engine;
- at least one energy conversion device positioned downstream from said combustion device for converting heat energy into other forms of energy;
- a feedback oxygen sensor positioned downstream from said combustion device providing sensing signals indicative to an air-to-fuel ratio of an exhaust air flow passing through said NOx removal catalyst; and
- a system controller configured to control an fuel delivering rate of said fuel supply to said combustion device to maintain said air-to-fuel ratio of said exhaust air flow passing through said NOx removal catalyst in a target range determined by said air-to-fuel ratio window during deNOx operations, according to at least said sensing values obtained from said feedback oxygen sensor, and a mass flow rate of exhaust air produced from said engine.

12. The emission control apparatus of claim 10, further comprising:
- a NOx removal catalyst positioned downstream from said heat exchanging device having NOx in exhaust air effectively reduced through direct reactions with hydrocarbon and carbon monoxide in an air-to-fuel ratio window with its lower bound lower than a stoichiometric air-to-fuel ratio and its upper bound higher than said stoichiometric air-to-fuel ratio;
- at least one oxygen sorption device including oxygen sorption materials absorbing and desorbing oxygen positioned upstream from said NOx removal catalyst; and
- a controller configured to operate said oxygen sorption device to maintain an air-to-fuel ratio of an exhaust air flow passing through said NOx removal catalyst in a target range determined by said air-to-fuel ratio window during deNOx operations.

13. The emission control apparatus of claim 12, wherein said oxygen sorption device includes at least two functional sections working sequentially in removing oxygen from said exhaust air flow passing through said NOx removal catalyst.

14. The emission control apparatus of claim 13, wherein said functional sections include a working section, in which a rich exhaust flow is produced with oxygen being adsorbed from a lean exhaust air flow before entering said NOx removal catalyst, and a regeneration section, in which oxygen is desorbed to said rich exhaust air flow after passing through said NOx removal catalyst.

15. The emission control apparatus of claim 14, wherein said oxygen sorption materials include perovskite-related oxides.

\* \* \* \* \*